(12) United States Patent
Liu et al.

(10) Patent No.: US 12,080,018 B2
(45) Date of Patent: Sep. 3, 2024

(54) TRACKING APPARATUS, METHOD, AND NON-TRANSITORY COMPUTER READABLE STORAGE MEDIUM THEREOF

(71) Applicant: HTC Corporation, Taoyuan (TW)

(72) Inventors: Yen-Ting Liu, Taoyuan (TW); Meng-Ju Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/190,154

(22) Filed: Mar. 27, 2023

(65) Prior Publication Data

US 2023/0316560 A1 Oct. 5, 2023

Related U.S. Application Data

(60) Provisional application No. 63/362,126, filed on Mar. 30, 2022.

(51) Int. Cl.
| | |
|---|---|
| *G06Q 30/02* | (2023.01) |
| *G06F 3/01* | (2006.01) |
| *G06T 3/04* | (2024.01) |
| *G06T 7/13* | (2017.01) |
| *G06T 7/20* | (2017.01) |
| *G06T 7/70* | (2017.01) |
| *H04N 5/262* | (2006.01) |

(52) U.S. Cl.
CPC ............ *G06T 7/70* (2017.01); *G06F 3/011* (2013.01); *G06T 3/04* (2024.01); *G06T 7/13* (2017.01); *G06T 7/20* (2013.01); *H04N 5/2628* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 8,884,949 B1 * | 11/2014 | Lambert | ............... | G06V 40/103 |
| | | | | 345/426 |
| 2020/0065584 A1 * | 2/2020 | Iyer | ............................ | G06T 7/70 |
| 2020/0126125 A1 * | 4/2020 | Sanjay | ............... | G06Q 30/0261 |

* cited by examiner

*Primary Examiner* — Carl Adams (74) *Attorney, Agent, or Firm* — CKC & Partners Co., LLC (57) ABSTRACT

A tracking apparatus, method, and non-transitory computer readable storage medium thereof are provided. The tracking apparatus generates a map information of simultaneous localization and mapping corresponding to a regional space based on a real-time image. The tracking apparatus calculates a first spatial position and a first orientation of a first display related to the image capturing device in the regional space based on the map information. The tracking apparatus calculates a human pose of a first operating user in the regional space. The tracking apparatus transforms the real-time image to generate a first transformed image corresponding to the first operating user based on the first spatial position, the first orientation, and the human pose, wherein the first transformed image is displayed on the first display.

20 Claims, 7 Drawing Sheets

TRACKING APPARATUS, METHOD, AND NON-TRANSITORY COMPUTER READABLE STORAGE MEDIUM THEREOF

CROSS-REFERENCE TO RELATED APPLICATION

This application claims priority to U.S. Provisional Application Ser. No. 63/362,126, filed Mar. 30, 2022, which is herein incorporated by reference in its entirety.

BACKGROUND

Field of Invention

The present invention relates to a tracking apparatus, method, and non-transitory computer readable storage medium thereof. More particularly, the present invention relates to a tracking apparatus, method, and non-transitory computer readable storage medium thereof for extending a field of view of a display.

Description of Related Art

In recent years, various technologies related to displays have developed rapidly, and various technologies and applications of interaction-related have been proposed one after another. In the prior art, the camera used to capture the image of the operating user is usually fixedly installed on the body of the display device (e.g., installed on the upper end of the TV screen), and the image of the operating user is photographed from a frontal angle for performing the interactive operation.

However, due to the fixed position of the display itself, the camera installed on the display can only shoot images from a fixed position and angle. Accordingly, the camera installed on the display may have problems such as shooting blind spot or being too far away from the operating user during shooting, resulting in images that cannot be correctly recognized, and the operating user has a bad experience in interactive operations.

For example, when the operating user moves out of the field of view of the camera installed on the display (i.e., the visual dead-zone) or when multiple operating users operate and the action is blocked, the camera on the display may lose track of the position and movement of some operating users. Since the display cannot track the spatial position of the operating user in real-time, it causes a poor operating experience for the operating user.

Accordingly, there is an urgent need for a tracking technology that can expand the field of view of the display.

SUMMARY

An objective of the present disclosure is to provide a tracking apparatus. The tracking apparatus comprises an image capturing device, and a processor, and the processor is electrically connected to the image capturing device. The image capturing device is configured to generate a real-time image. The processor generates a map information of simultaneous localization and mapping corresponding to a regional space based on the real-time image. The processor calculates a first spatial position and a first orientation of a first display related to the image capturing device in the regional space based on the map information. The processor calculates a human pose of a first operating user in the regional space. The processor transforms the real-time image to generate a first transformed image corresponding to the first operating user based on the first spatial position, the first orientation, and the human pose, and the first transformed image is displayed on the first display.

Another objective of the present disclosure is to provide a tracking method, which is adapted for use in an electronic apparatus. The electronic apparatus comprises an image capturing device and a processor. The image capturing device is configured to generate a real-time image. The tracking method comprises following steps: calculating a first spatial position and a first orientation of a first display related to the image capturing device in a regional space based on a map information of simultaneous localization and mapping corresponding to the regional space; calculating a human pose of a first operating user in the regional space; and transforming the real-time image to generate a first transformed image corresponding to the first operating user based on the first spatial position, the first orientation, and the human pose, wherein the first transformed image is displayed on the first display.

A further objective of the present disclosure is to provide a non-transitory computer readable storage medium having a computer program stored therein. The computer program comprises a plurality of codes, the computer program executes a tracking method after being loaded into an electronic computing apparatus. The electronic apparatus comprises an image capturing device and a processor. The image capturing device is configured to generate a real-time image. The tracking method comprises following steps: calculating a first spatial position and a first orientation of a first display related to the image capturing device in a regional space based on a map information of simultaneous localization and mapping corresponding to the regional space; calculating a human pose of a first operating user in the regional space; and transforming the real-time image to generate a first transformed image corresponding to the first operating user based on the first spatial position, the first orientation, and the human pose, wherein the first transformed image is displayed on the first display.

According to the above descriptions, the tracking technology (at least including the apparatus, the method, and the non-transitory computer readable storage medium) provided by the present disclosure generates a map information of simultaneous localization and mapping corresponding to a regional space through the real-time image generated by the tracking apparatus. Next, the tracking apparatus calculates a first spatial position and a first orientation of a display related to the image capturing device in the regional space based on the map information, and calculates a human pose of a first operating user in the regional space. Finally, the tracking apparatus transforms the real-time image to generate a first transformed image corresponding to the first operating user based on the first spatial position, the first orientation, and the human pose. The tracking technology provided by the present disclosure enables the tracking apparatus to expand the field of view of the display without being installed in a fixed position, thus solving the disadvantage that the display may not be able to accurately track the position and action of the operating user in the prior art. In addition, the tracking technology provided by the present disclosure can analyze the distance between the objects and the operating user to avoid collisions when the operating user performs interactive actions. Furthermore, the tracking technology provided by the present disclosure can provide simultaneous interaction between multiple operating users and multiple displays, and when the distance between operating users is too short, a warning message of possible collision can be sent through the display.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a tracking apparatus, method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1A:
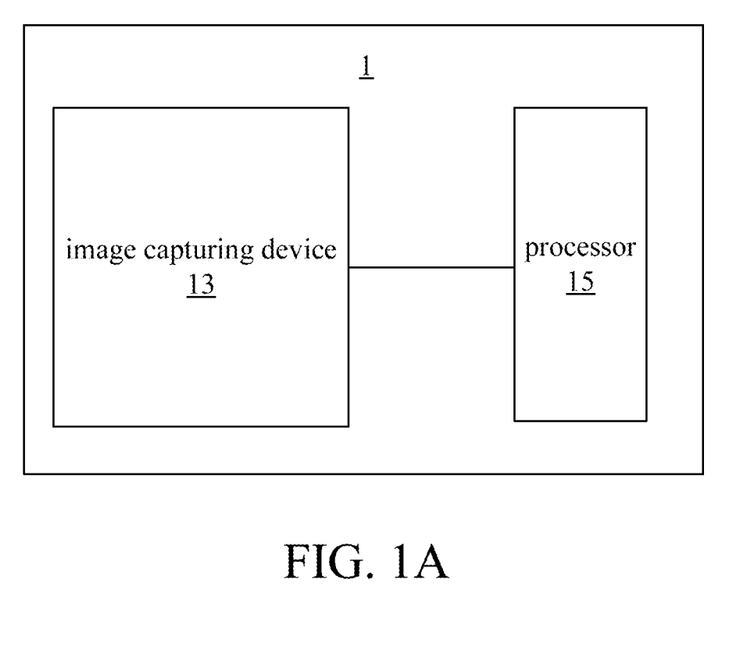
FIG. 1A is a schematic view depicting a structure a tracking apparatus of the first embodiment.

A first embodiment of the present disclosure is a tracking apparatus 1 and a schematic view of which is depicted in FIG. 1A. The tracking apparatus 1 comprises the image capturing device 13 and the processor 15, and the processor 15 is electrically connected to the image capturing device 13. The image capturing device 13 can be any device having an image capturing function. The processor 15 may be any of various processors, Central Processing Units (CPUs), microprocessors, digital signal processors or other computing apparatuses known to those of ordinary skill in the art.

Figure 2:
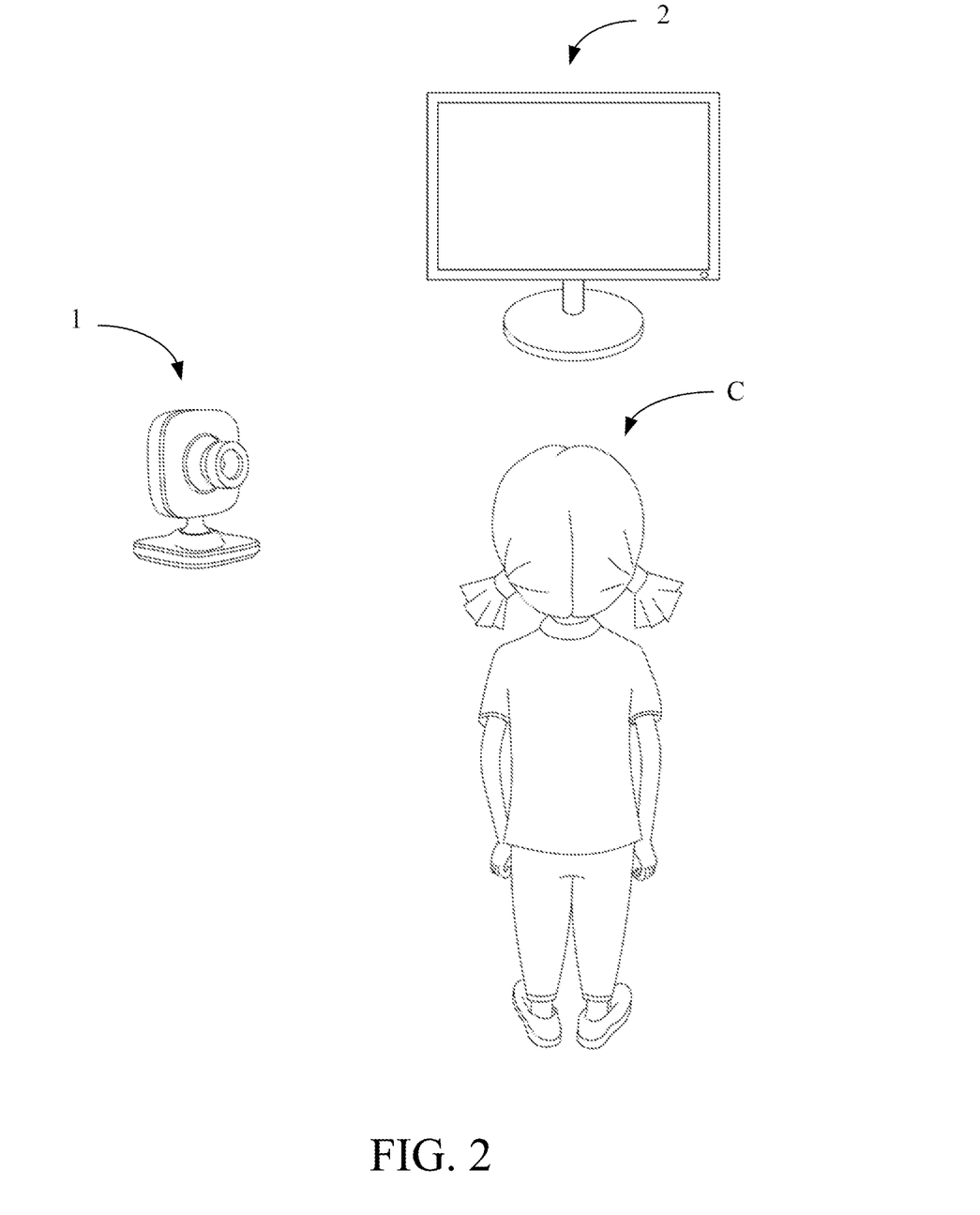
FIG. 2 is a schematic view depicting an operating environment of the first embodiment.

For ease of understanding, FIG. 2 illustrates a schematic diagram of an operating environment of the present disclosure. In the operating environment of the present disclosure, the tracking apparatus 1 and the display 2 (e.g., the first display) are set up in a regional space (e.g., the living room), and the operating user C (e.g., the first operating user) faces to the display 2 to perform various interactions (e.g., the control operation, the game, etc.) with the display 2.

It shall be appreciated that the tracking apparatus 1 is an outside-in tracking and locating apparatus, which can be installed in any position of the regional space (e.g., installed in various corners of the regional space, areas with dense obstacles, possible visual dead-zone, etc.).

In the present embodiment, the display 2 is set in a first spatial position facing the operating user C in the regional space.

In the present embodiment, the image capturing device 13 is configured to generate a real-time image. It shall be appreciated that the image capturing device 13 of the tracking apparatus 1 may comprise a plurality of image capturing units (e.g., a plurality of depth camera lenses) for generating a real-time image. For example, the image capturing device 13 may comprise three image capturing units disposed on the upper, the middle, and the lower sides of the tracking apparatus 1, and the field of view corresponding to the tracking apparatus 1 is composed of real-time images corresponding to the upper, the middle, and the lower sides.

In the present embodiment, the processor 15 generates a map information of simultaneous localization and mapping corresponding to the regional space based on the real-time image.

Specifically, the map information may be the spatial map information generated by the tracking apparatus 1 by performing a simultaneous localization and mapping (SLAM) operation. It shall be appreciated that the map information may comprise position information of all characteristic objects in the space (e.g., objects in the regional space), and the tracking apparatus 1 may identify the position of each characteristic object in the regional space through the real-time image generated by the image capturing device 13.

In some embodiments, after the tracking apparatus 1 performs the simultaneous localization and mapping operation, the tracking apparatus 1 may further identify objects and types of objects in the regional space by performing scene understanding operations, and thus the tracking apparatus 1 may perform various related determinations and applications according to the identified objects.

In some embodiments, the processor 15 may generate a plurality of point clouds corresponding to the regional space based on the map information. Next, the processor 15 analyzes the point clouds to identify a plurality of objects and the object types in the regional space.

Next, the processor 15 calculates the first spatial position and a first orientation of the display 2 related to the image capturing device 13 in the regional space based on the map information.

In some embodiments, in order to locate the orientation of the display 2 more accurately, the processor 15 may further locate the orientation of the display 2 based on other information. Specifically, the processor 15 may locate the first orientation of the display 2 in the regional space based on a labeling information, and the labeling information comprises a boundary position corresponding to the display 2. It shall be appreciated that the labeling information can be generated by the processor 15 by analyzing the four corner positions of the screens of the display 2.

In some embodiments, the processor 15 may locate the first orientation of the display 2 in the regional space through the following operations. First, the processor 15 calculates a normal vector of the point clouds located in the boundary position (e.g., the normal vector of the plane formed by all the point clouds located in the boundary position of the display 2). Next, the processor 15 locates the first orientation of the display 2 in the regional space based on the normal vector.

Next, the processor 15 calculates a human pose of the operating user C in the regional space. In some embodiments, the processor 15 can calculate and analyze the posture of the human body of the operating user C through the analysis technology of the human skeleton shape and torque in biomechanics.

For example, the processor 15 may calculate the human pose of the operating user C (including the spatial position and the orientation) in the regional space based on the map information and the positional relationship of the objects in the regional space.

In some embodiments, the processor 15 may estimate the spatial position and the orientation of the operating user C by analyzing the positional relationship between the tracking apparatus 1 and the display 2. In addition, the processor 15 of the tracking apparatus 1 may periodically calculate the spatial position and the orientation of the operating user C or the display 2 based on a predetermined period (e.g., at a fixed frequency of 5 times per second).

Finally, the processor 15 transforms the real-time image to generate a first transformed image corresponding to the operating user C based on the first spatial position, the first orientation, and the human pose, and the first transformed image is displayed on the display 2.

It shall be appreciated that the first transformed image is an image generated by the processor 15 through the transforming operation, which can be used to simulate the display 2 to capture the image facing the operating user C.

In some embodiments, the first transformed image comprises the real-time image corresponding to the operating user C or an avatar corresponding to the human pose.

In some embodiments, the tracking apparatus 1 further transmits the first transformed image to the display 2, so that the display 2 may display the first transformed image and interact with the operating user C.

In some embodiments, the tracking apparatus 1 can transform the real-time image by calculating the difference in viewing angle with the display 2. Specifically, the processor 15 calculates a transforming parameter based on a first viewing angle and a second viewing angle corresponding to the regional space, and the first viewing angle corresponds to the first spatial position and the first orientation (i.e., the viewing angle of the display 2), and the second viewing angle corresponds to a second spatial position and a second orientation of the image capturing device 13 (i.e., the viewing angle of the image capturing device 13 in the tracking apparatus 1). Next, the processor 15 transforms the real-time image to generate the first transformed image corresponding to the operating user C based on the transforming parameter, wherein the first transformed image comprises the real-time image corresponding to the operating user C or an avatar corresponding to the human pose.

In some embodiments, the processor 15 can transform the real-time image through a coordinate align or a transforming algorithm to generate the first transformed image corresponding to the operating user C.

Figure 3:
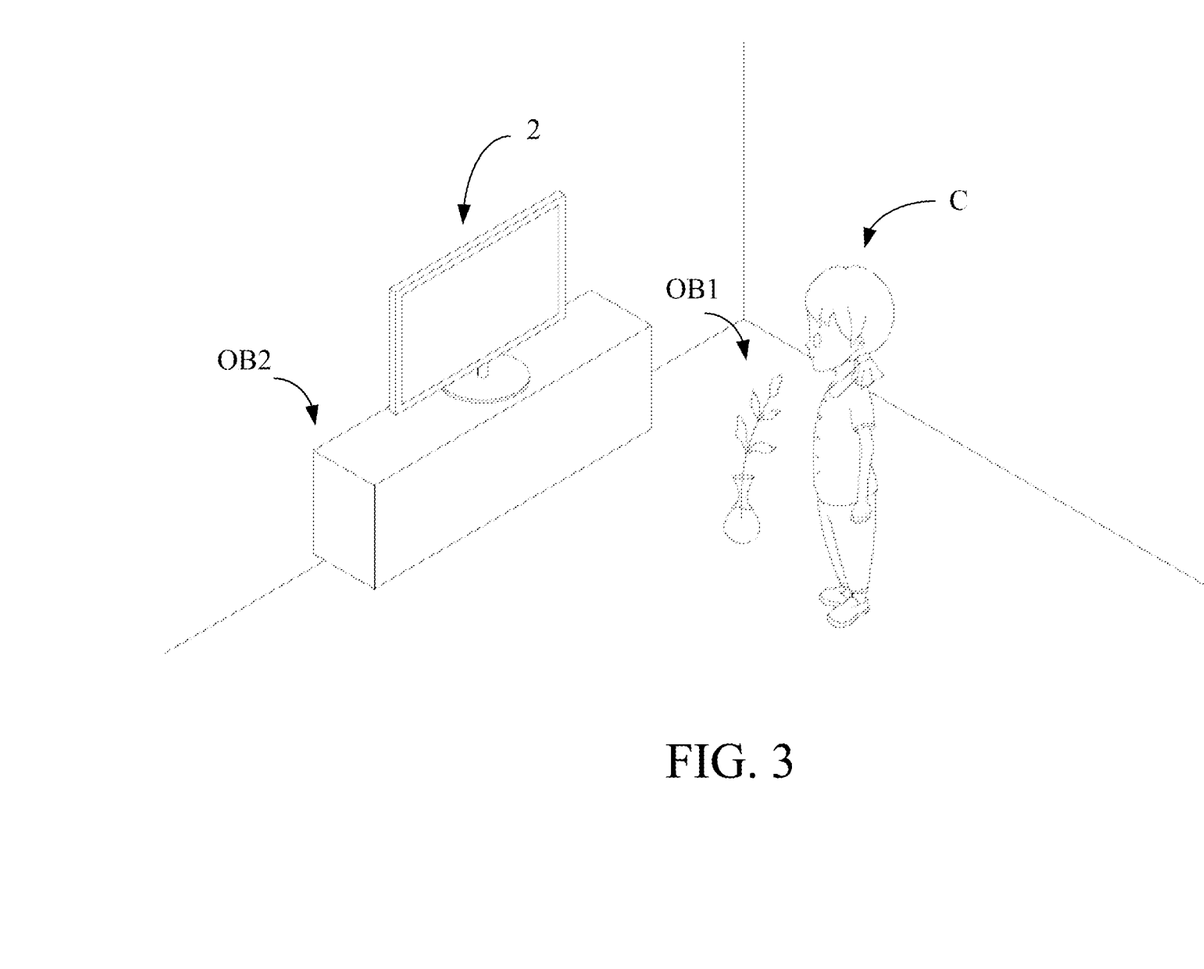
FIG. 3 is a schematic view depicting a real-time image of some embodiments.
Figure 4:
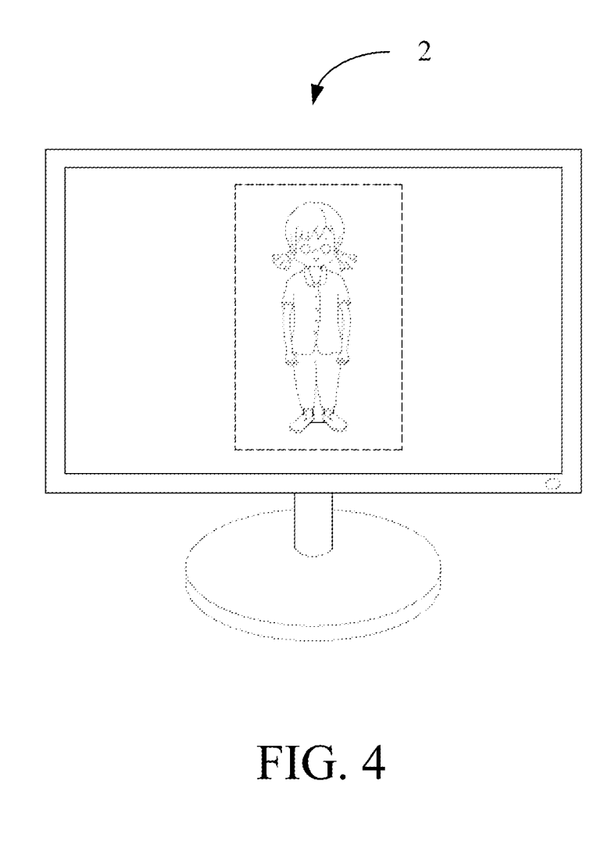
FIG. 4 is a schematic view depicting a transformed image of some embodiments.

For a better understanding of the content of the transforming of the viewing angle, please further refer to FIG. 3 and FIG. 4. FIG. 3 is a real-time image (i.e., the second viewing angle of the tracking apparatus 1) captured by the position of the tracking apparatus 1 corresponding to the regional space, and the real-time image at least comprises the display 2 and the operating user C. In the present example, the tracking apparatus 1 transforms the real-time image shown in FIG. 3 into the first transformed image shown in FIG. 4 (i.e., the first viewing angle of the display 2), and the first transformed image at least comprises the operating user C (e.g., the real-time image or the avatar).

In some embodiments, the processor 15 may further generate a plurality of objects corresponding to the regional space based on the map information. Next, the processor 15 calculates a linear distance between each of the objects and the operating user C. Next, the processor 15 determines whether the linear distance corresponding to a first object among the objects is lower than a safe distance. Finally, the processor 15 generates a reminder message corresponding to the first object when determining the linear distance corresponding to the first object among the objects is lower than the safe distance, wherein the reminder message is displayed on the display 2.

For example, as shown in FIG. 3, the processor 15 determines that the linear distance between the object OB1 and the operating user C among the objects OB1 and OB2 is lower than the safe distance (e.g., lower than 100 cm). Therefore, the processor 15 generates a reminder message corresponding to the object OB1 and displays it on the display 2 (i.e., the first display).

In some embodiments, the processor 15 may determine whether a dangerous object corresponding to a dangerous type appears in the regional space. When it is determined that the dangerous object appears in the regional space, the processor 15 generates the reminder message corresponding the dangerous type, wherein the reminder message is displayed on the display 2.

For example, as shown in FIG. 3, the processor 15 may determine that the object OB1 is a vase, and the object OB2 is a cabinet. In the present example, the processor 15 determines that the object OB1 corresponding to the fragile object vase appears in the area, and the processor 15 generates a reminder message "There are fragile objects in the environment" and displays it on the display 2.

Figure 1B:
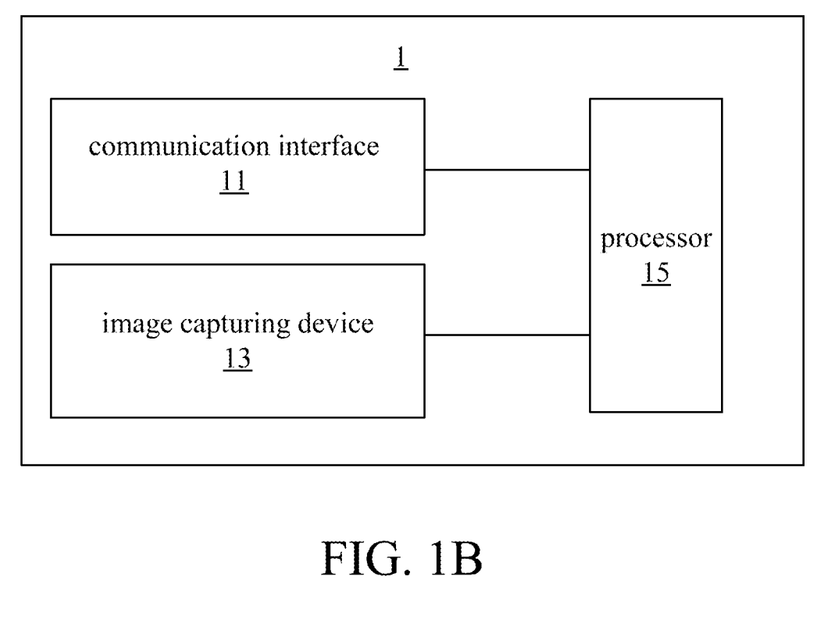
FIG. 1B is a schematic view depicting a structure a tracking apparatus of some embodiments.

In some embodiments, the tracking apparatus 1 can assist the operating user C to interact with multiple displays at the same time (e.g., a game with a surround view screen). Taking two displays as an example, in addition to performing the operation of the aforementioned tracking apparatus 1, the tracking apparatus 1 further comprises a communication interface 11 (as shown in FIG. 1B). The communication interface 11 is communicatively connected to the first display and a second display in the regional space, wherein the first display is set at the first spatial position facing the operating user C in the regional space, the second display is set in a third spatial position facing the operating user C in the regional space, the third spatial position is different from the first spatial position. First, the processor 15 calculates the third spatial position and a third orientation of the second display in the regional space based on the map information. Next, the processor 15 transforms the real-time image to generate a second transformed image corresponding to the first operating user based on the third spatial position, the third orientation, and the human pose, wherein the second transformed image is displayed on the second display.

In some embodiments, the tracking apparatus 1 can simultaneously assist multiple operating users to interact with multiple displays. Taking two operating users and two displays as an example, in addition to performing the operation of the aforementioned tracking apparatus 1, the tracking apparatus 1 further comprises a communication interface 11 (as shown in FIG. 1B). The communication interface 11 is communicatively connected to the first display and a third display in the regional space, wherein the third display is set in a fourth spatial position facing a second operating user in the regional space, the fourth spatial position is different from the first spatial position. The processor 15 may calculate the fourth spatial position and a fourth orientation of the third display in the regional space based on the map information. Next, the processor 15 transforms the real-time image to generate a third transformed image corresponding to the second operating user based on the fourth spatial position, the fourth orientation, and the human pose, wherein the third transformed image is displayed on the third display.

It shall be appreciated that the processor 15 is electrically connected to the communication interface 11 and the image capturing device 13. The communication interface 11 is an interface capable of receiving and transmitting data or other interfaces capable of receiving and transmitting data and known to those of ordinary skill in the art.

In some embodiments, the tracking apparatus 1 may determine whether the distance between a plurality of operating users is too close and generate a reminder message. Specifically, the processor 15 calculates a linear distance between the first operating user and the second operating user. Next, the processor 15 determines whether the linear distance between the first operating user and the second operating user is less than an operating distance. Then, the processor 15 generates a second reminder message when determining the linear distance between the first operating user and the second operating user is lower than the operating distance, wherein the second reminder message is displayed on the first display and the third display.

In some embodiments, the tracking apparatus 1 may determine an activity area where the user can do an operating activity, and when the user moves beyond the activity area, a reminder message will be generated to remind the operating user to pay attention (e.g., pausing the game or making an alert sound).

Figure 5:
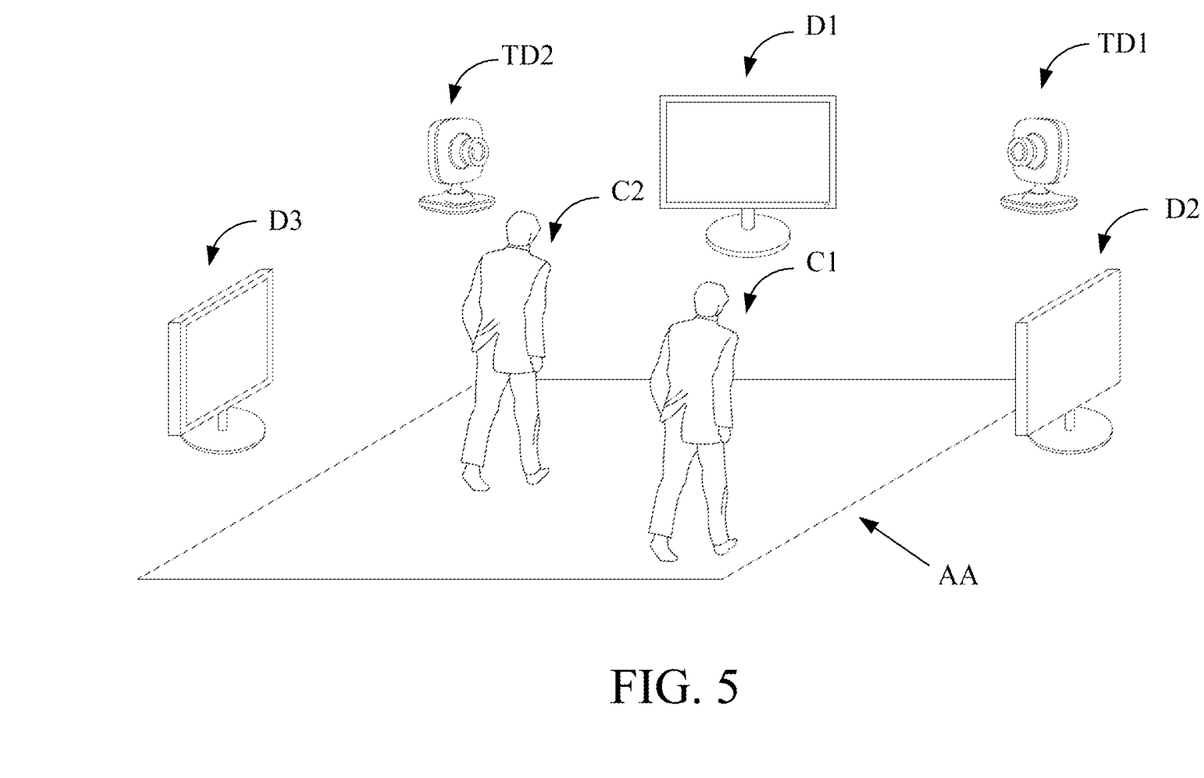
FIG. 5 is a schematic view depicting an operating environment of some embodiments.

For ease of understanding, please refer to FIG. 5. FIG. 5 illustrates a schematic diagram of simultaneous operations by the operating user C1 and the operating user C2. As shown in FIG. 5, a first display D1, a second display D2, and a third display D3 are respectively installed in the regional area, and a tracking device TD1 is installed near the positions of the first display D1 and the second display D2. A tracking device TD2 is installed near the positions of the display D1 and the third display D3.

In the present example, the tracking device TD1 is responsible for the real-time image transforming of the first display D1 and the second display D2, and the tracking device TD2 is responsible for the real-time image transforming of the third display D3. In addition, the operating user C1 and the operating user C2 can perform interactive operations in the active area AA determined by the tracking devices TD1 and TD2 (i.e., when the operating user C1 or C2 moves out of the active area AA, a reminder message will be generated to remind the operating user).

In the present example, the tracking apparatus TD1 calculates the linear distance between the first operating user C1 and the second operating user C2. Therefore, when the tracking apparatus TD1 determines that the linear distance between the first operating user C1 and the second operating user C2 is lower than the operating distance (e.g., less than 100 cm), the tracking apparatus TD1 may generate a reminder message and display it on the first display D1 and the second display D2.

According to the above descriptions, the tracking apparatus 1 provided by the present disclosure generates a map information of simultaneous localization and mapping corresponding to a regional space through the real-time image generated by the tracking apparatus. Next, the tracking apparatus 1 calculates a first spatial position and a first orientation of a display related to the image capturing device in the regional space based on the map information, and calculates a human pose of a first operating user in the regional space. Finally, the tracking apparatus 1 transforms the real-time image to generate a first transformed image corresponding to the first operating user based on the first spatial position, the first orientation, and the human pose. The tracking apparatus 1 provided by the present disclosure enables the tracking apparatus to expand the field of view of the display without being installed in a fixed position, thus solving the disadvantage that the display may not be able to accurately track the position and action of the operating user in the prior art. In addition, the tracking apparatus 1 provided by the present disclosure can analyze the distance between the objects and the operating user to avoid collisions when the operating user performs interactive actions. Furthermore, the tracking apparatus 1 provided by the present disclosure can provide simultaneous interaction between multiple operating users and multiple displays, and when the distance between operating users is too short, a warning message of possible collision can be sent through the display.

Figure 6:
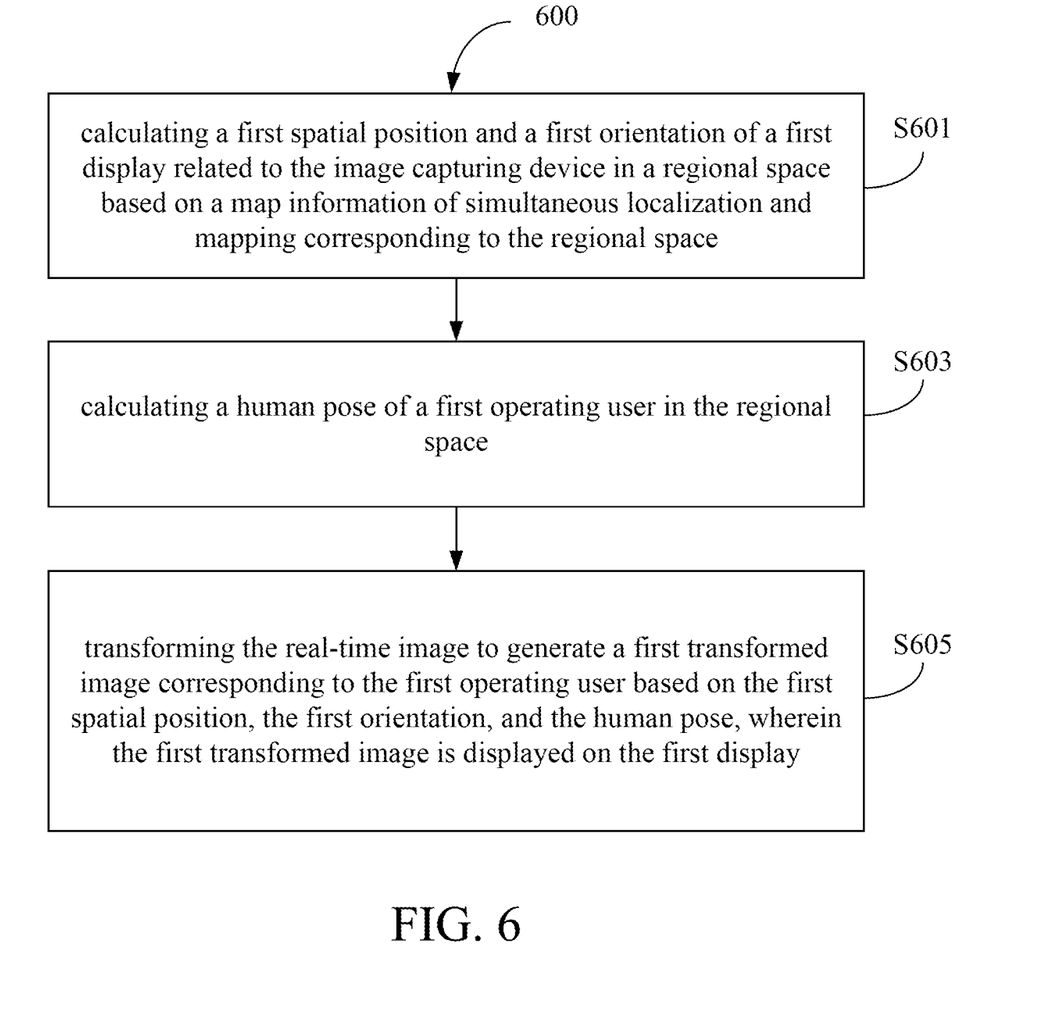
FIG. 6 is a partial flowchart depicting a tracking method of the second embodiment.

A second embodiment of the present disclosure is a tracking method and a flowchart thereof is depicted in FIG. 6. The tracking method 600 is adapted for an electronic apparatus (e.g., the tracking apparatus 1 of the first embodiment). The electronic apparatus comprises an image capturing device and a processor (e.g., the image capturing device 13 and the processor 15 of the first embodiment). The image capturing device is configured to generate a real-time image. The tracking method 600 generates the transformed image through the steps S601 to S605.

In the step S601, the electronic apparatus calculates a first spatial position and a first orientation of a first display related to the image capturing device in a regional space based on a map information of simultaneous localization and mapping corresponding to the regional space.

Next, in the step S603, the electronic apparatus calculates a human pose of a first operating user in the regional space.

Finally, in the step S605, the electronic apparatus transforms the real-time image to generate a first transformed image corresponding to the first operating user based on the first spatial position, the first orientation, and the human pose, wherein the first transformed image is displayed on the first display.

In some embodiments, the tracking method 600 further comprises following steps: calculating a transforming parameter based on a first viewing angle and a second viewing angle corresponding to the regional space, wherein the first viewing angle corresponds to the first spatial position and the first orientation, and the second viewing angle corresponds to a second spatial position and a second orientation of the image capturing device; and transforming the real-time image to generate the first transformed image corresponding to the first operating user based on the transforming parameter; wherein the first transformed image comprises the real-time image corresponding to the first operating user or an avatar corresponding to the human pose.

In some embodiments, the electronic apparatus further comprises a communication interface, the communication interface is communicatively connected to the first display and a second display in the regional space, wherein the first display is set at the first spatial position facing the first operating user in the regional space, the second display is set in a third spatial position facing the first operating user in the regional space, the third spatial position is different from the first spatial position, and the tracking method 600 further comprises following steps: calculating the third spatial position and a third orientation of the second display in the regional space based on the map information; and transforming the real-time image to generate a second transformed image corresponding to the first operating user based on the third spatial position, the third orientation, and the human pose, wherein the second transformed image is displayed on the second display.

In some embodiments, the electronic apparatus further comprises a communication interface, the communication interface is communicatively connected to the first display and a third display in the regional space, wherein the third display is set in a fourth spatial position facing a second operating user in the regional space, the fourth spatial position is different from the first spatial position, and the tracking method 600 further comprises following steps: calculating the fourth spatial position and a fourth orientation of the third display in the regional space based on the map information; and transforming the real-time image to generate a third transformed image corresponding to the second operating user based on the fourth spatial position, the fourth orientation, and the human pose, wherein the third transformed image is displayed on the third display.

In some embodiments, the tracking method 600 further comprises following steps: generating a plurality of objects corresponding to the regional space based on the map information; calculating a linear distance between each of the objects and the first operating user; determining whether the linear distance corresponding to a first object among the objects is lower than a safe distance; and generating a reminder message corresponding to the first object when determining the linear distance corresponding to the first object among the objects is lower than the safe distance, wherein the reminder message is displayed on the first display.

In some embodiments, the tracking method 600 further comprises following steps: determining whether a dangerous object corresponding to a dangerous type appears in the regional space; and generating the reminder message corresponding the dangerous type when determining the dangerous object appears in the regional space, wherein the reminder message is displayed on the first display.

In some embodiments, the tracking method 600 further comprises following steps: generating a plurality of point clouds corresponding to the regional space based on the map information; and analyzing the point clouds to identify a plurality of objects in the regional space.

In some embodiments, the tracking method 600 further comprises following steps: locating the first orientation of the first display in the regional space based on a labeling information, wherein the labeling information comprises a boundary position corresponding to the first display.

In some embodiments, the tracking method 600 further comprises following steps: calculating a normal vector of the point clouds located in the boundary position; and locating the first orientation of the first display in the regional space based on the normal vector.

In addition to the aforesaid steps, the second embodiment can also execute all the operations and steps of the tracking apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The tracking method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the tracking apparatus 1), the computer program executes the tracking method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the display, the operating user, the regional space, the orientation, the transformed image, the viewing angle, the object, etc.) are preceded by terms such as "first", "second", "third", and "fourth", and these terms of "first", "second", "third", and "fourth" are only used to distinguish these different words. For example, the "first" and "second" in the first display and the second display are only used to indicate different displays used in different operations.

According to the above descriptions, the tracking technology (at least including the apparatus, the method, and the non-transitory computer readable storage medium) provided by the present disclosure generates a map information of simultaneous localization and mapping corresponding to a regional space through the real-time image generated by the tracking apparatus. Next, the tracking apparatus calculates a first spatial position and a first orientation of a display related to the image capturing device in the regional space based on the map information, and calculates a human pose of a first operating user in the regional space. Finally, the tracking apparatus transforms the real-time image to generate a first transformed image corresponding to the first operating user based on the first spatial position, the first orientation, and the human pose. The tracking technology provided by the present disclosure enables the tracking apparatus to expand the field of view of the display without being installed in a fixed position, thus solving the disadvantage that the display may not be able to accurately track the position and action of the operating user in the prior art. In addition, the tracking technology provided by the present disclosure can analyze the distance between the objects and the operating user to avoid collisions when the operating user performs interactive actions. Furthermore, the tracking technology provided by the present disclosure can provide simultaneous interaction between multiple operating users and multiple displays, and when the distance between operating users is too short, a warning message of possible collision can be sent through the display.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A tracking apparatus, comprising:
an image capturing device, being configured to generate a real-time image; and
a processor, being electrically connected to the image capturing device, and being configured to perform operations comprising:
generating a map information of simultaneous localization and mapping corresponding to a regional space based on the real-time image;
calculating a first spatial position and a first orientation of a first display related to the image capturing device in the regional space based on the map information;
calculating a human pose of a first operating user in the regional space; and
transforming the real-time image to generate a first transformed image corresponding to the first operating user based on the first spatial position, the first orientation, and the human pose, wherein the first transformed image is used to simulate an image captured by the first display facing the first operating user, and the first transformed image is displayed on the first display.

2. The tracking apparatus of claim 1, wherein the processor is further configured to perform following operations:
calculating a transforming parameter based on a first viewing angle and a second viewing angle corresponding to the regional space, wherein the first viewing angle corresponds to the first spatial position and the first orientation, and the second viewing angle corresponds to a second spatial position and a second orientation of the image capturing device; and
transforming the real-time image to generate the first transformed image corresponding to the first operating user based on the transforming parameter;
wherein the first transformed image comprises the real-time image corresponding to the first operating user or an avatar corresponding to the human pose.

3. The tracking apparatus of claim 1, further comprising:
a communication interface, being communicatively connected to the first display and a second display in the regional space, wherein the first display is set at the first spatial position facing the first operating user in the regional space, the second display is set in a third spatial position facing the first operating user in the regional space, the third spatial position is different from the first spatial position,
wherein the processor further performs following operations:
calculating the third spatial position and a third orientation of the second display in the regional space based on the map information; and
transforming the real-time image to generate a second transformed image corresponding to the first operating user based on the third spatial position, the third orientation, and the human pose, wherein the second transformed image is displayed on the second display.

4. The tracking apparatus of claim 1, further comprising:
a communication interface, being communicatively connected to the first display and a third display in the regional space, wherein the third display is set in a fourth spatial position facing a second operating user in the regional space, the fourth spatial position is different from the first spatial position,
wherein the processor further performs following operations:
calculating the fourth spatial position and a fourth orientation of the third display in the regional space based on the map information; and
transforming the real-time image to generate a third transformed image corresponding to the second operating user based on the fourth spatial position, the fourth orientation, and the human pose, wherein the third transformed image is displayed on the third display.

5. The tracking apparatus of claim 4, wherein the processor is further configured to perform following operations:
calculating a linear distance between the first operating user and the second operating user;
determining whether the linear distance between the first operating user and the second operating user is less than an operating distance; and
generating a second reminder message when determining the linear distance between the first operating user and the second operating user is lower than the operating distance, wherein the second reminder message is displayed on the first display and the third display.

6. The tracking apparatus of claim 1, wherein the processor is further configured to perform following operations:
generating a plurality of objects corresponding to the regional space based on the map information;
calculating a linear distance between each of the objects and the first operating user;
determining whether the linear distance corresponding to a first object among the objects is lower than a safe distance; and
generating a reminder message corresponding to the first object when determining the linear distance corresponding to the first object among the objects is lower than the safe distance, wherein the reminder message is displayed on the first display.

7. The tracking apparatus of claim 6, wherein the processor is further configured to perform following operations:
determining whether a dangerous object corresponding to a dangerous type appears in the regional space; and
generating the reminder message corresponding the dangerous type when determining the dangerous object appears in the regional space, wherein the reminder message is displayed on the first display.

8. The tracking apparatus of claim 1, wherein the processor is further configured to perform following operations:
generating a plurality of point clouds corresponding to the regional space based on the map information; and
analyzing the point clouds to identify a plurality of objects in the regional space.

9. The tracking apparatus of claim 8, wherein the processor is further configured to perform following operations:
locating the first orientation of the first display in the regional space based on a labeling information, wherein the labeling information comprises a boundary position corresponding to the first display.

10. The tracking apparatus of claim 9, wherein the processor is further configured to perform following operations:
calculating a normal vector of the point clouds located in the boundary position; and
locating the first orientation of the first display in the regional space based on the normal vector.

11. A tracking method, being adapted for use in an electronic apparatus, wherein the electronic apparatus comprises an image capturing device and a processor, the image capturing device is configured to generate a real-time image, and the tracking method comprises:

calculating a first spatial position and a first orientation of a first display related to the image capturing device in a regional space based on a map information of simultaneous localization and mapping corresponding to the regional space;

calculating a human pose of a first operating user in the regional space; and transforming the real-time image to generate a first transformed image corresponding to the first operating user based on the first spatial position, the first orientation, and the human pose, wherein the first transformed image is used to simulate an image captured by the first display facing the first operating user, and the first transformed image is displayed on the first display.

12. The tracking method of claim 11, wherein the tracking method further comprises following steps:

calculating a transforming parameter based on a first viewing angle and a second viewing angle corresponding to the regional space, wherein the first viewing angle corresponds to the first spatial position and the first orientation, and the second viewing angle corresponds to a second spatial position and a second orientation of the image capturing device; and transforming the real-time image to generate the first transformed image corresponding to the first operating user based on the transforming parameter;

wherein the first transformed image comprises the real-time image corresponding to the first operating user or an avatar corresponding to the human pose.

13. The tracking method of claim 11, wherein the electronic apparatus further comprises a communication interface, the communication interface is communicatively connected to the first display and a second display in the regional space, wherein the first display is set at the first spatial position facing the first operating user in the regional space, the second display is set in a third spatial position facing the first operating user in the regional space, the third spatial position is different from the first spatial position, and the tracking method further comprises following steps:

calculating the third spatial position and a third orientation of the second display in the regional space based on the map information; and transforming the real-time image to generate a second transformed image corresponding to the first operating user based on the third spatial position, the third orientation, and the human pose, wherein the second transformed image is displayed on the second display.

14. The tracking method of claim 11, wherein the electronic apparatus further comprises a communication interface, the communication interface is communicatively connected to the first display and a third display in the regional space, wherein the third display is set in a fourth spatial position facing a second operating user in the regional space, the fourth spatial position is different from the first spatial position, and the tracking method further comprises following steps:

calculating the fourth spatial position and a fourth orientation of the third display in the regional space based on the map information; and transforming the real-time image to generate a third transformed image corresponding to the second operating user based on the fourth spatial position, the fourth orientation, and the human pose, wherein the third transformed image is displayed on the third display.

15. The tracking method of claim 11, wherein the tracking method further comprises following steps:

generating a plurality of objects corresponding to the regional space based on the map information;

calculating a linear distance between each of the objects and the first operating user;

determining whether the linear distance corresponding to a first object among the objects is lower than a safe distance; and generating a reminder message corresponding to the first object when determining the linear distance corresponding to the first object among the objects is lower than the safe distance, wherein the reminder message is displayed on the first display.

16. The tracking method of claim 15, wherein the tracking method further comprises following steps:

determining whether a dangerous object corresponding to a dangerous type appears in the regional space; and generating the reminder message corresponding the dangerous type when determining the dangerous object appears in the regional space, wherein the reminder message is displayed on the first display.

17. The tracking method of claim 11, wherein the tracking method further comprises following steps:

generating a plurality of point clouds corresponding to the regional space based on the map information; and analyzing the point clouds to identify a plurality of objects in the regional space.

18. The tracking method of claim 17, wherein the tracking method further comprises following steps:

locating the first orientation of the first display in the regional space based on a labeling information, wherein the labeling information comprises a boundary position corresponding to the first display.

19. The tracking method of claim 18, wherein the tracking method further comprises following steps:

calculating a normal vector of the point clouds located in the boundary position; and locating the first orientation of the first display in the regional space based on the normal vector.

20. A non-transitory computer readable storage medium, having a computer program stored therein, wherein the computer program comprises a plurality of codes, the computer program executes a tracking method after being loaded into an electronic apparatus, the electronic apparatus comprises an image capturing device and a processor, the image capturing device is configured to generate a real-time image, the tracking method comprises:

calculating a first spatial position and a first orientation of a first display related to the image capturing device in a regional space based on a map information of simultaneous localization and mapping corresponding to the regional space;

calculating a human pose of a first operating user in the regional space; and transforming the real-time image to generate a first transformed image corresponding to the first operating user based on the first spatial position, the first orientation, and the human pose, wherein the first transformed image is used to simulate an image captured by the first display facing the first operating user, and the first transformed image is displayed on the first display.

* * * * *